United States Patent
Miller et al.

(10) Patent No.: US 8,959,374 B2
(45) Date of Patent: Feb. 17, 2015

(54) POWER MANAGEMENT FOR DEVICES IN A DATA STORAGE FABRIC

(75) Inventors: Paul Miller, Houston, TX (US); Aaron L. Jenkins, Tomball, TX (US); Balaji Natrajan, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 13/563,122

(22) Filed: Jul. 31, 2012

(65) Prior Publication Data
US 2014/0040648 A1    Feb. 6, 2014

(51) Int. Cl.
*G06F 1/32* (2006.01)

(52) U.S. Cl.
USPC .............. 713/324; 713/320; 713/323

(58) Field of Classification Search
CPC .... G06F 1/3203; G06F 1/3221; G06F 1/3268
USPC .......................... 713/320, 323, 324
See application file for complete search history.

(56) References Cited

U.S. PATENT DOCUMENTS

| | | | |
|---|---|---|---|
| 7,330,989 B2 | 2/2008 | Bashford et al. | |
| 7,584,368 B2 | 9/2009 | Nichols et al. | |
| 8,407,504 B2 * | 3/2013 | Walsh | 713/322 |
| 8,464,084 B2 * | 6/2013 | Huffman et al. | 713/320 |
| 8,656,198 B2 * | 2/2014 | Branover et al. | 713/323 |
| 2005/0210159 A1 * | 9/2005 | Voorhees et al. | 710/5 |
| 2007/0168571 A1 | 7/2007 | Ramsey et al. | |
| 2008/0209246 A1 * | 8/2008 | Marks et al. | 713/323 |
| 2009/0187779 A1 | 7/2009 | Liu et al. | |
| 2010/0058322 A1 | 3/2010 | Oikawa et al. | |
| 2010/0180135 A1 * | 7/2010 | Lambert | 713/323 |
| 2010/0205462 A1 * | 8/2010 | Rauschmayer et al. | 713/300 |
| 2010/0332866 A1 * | 12/2010 | Lee et al. | 713/300 |
| 2011/0087913 A1 * | 4/2011 | Robles et al. | 713/330 |
| 2011/0107129 A1 | 5/2011 | Sinykin et al. | |

* cited by examiner

*Primary Examiner* — Chun Cao
(74) *Attorney, Agent, or Firm* — Dicke, Billig & Czaja, PLLC

(57) ABSTRACT

A method of power management for devices in a data storage fabric is disclosed. The data storage fabric includes a PHY having a first power condition and a second power condition coupled to a power condition independent device on the data storage fabric. The power condition independent device detects a change in the power configuration of the PHY from the first power condition to the second power condition. The power condition independent device then changes its power state to a comparable power state preselected to correspond with the second power condition.

20 Claims, 3 Drawing Sheets

POWER MANAGEMENT FOR DEVICES IN A DATA STORAGE FABRIC

BACKGROUND

In data storage technology, Small Computer System Interface, or SCSI, is a set of standards for physically connecting and transferring data between computers and peripheral devices. The SCSI standards define commands, protocols, and electrical and optical interfaces. SCSI is often used for hard disks and tape drives, but it can connect a wide range of other devices, including scanners and optical disc drives. The SCSI standard defines command sets for specific peripheral device types; the presence of "unknown" as one of these types means it can be used as an interface to almost any device, but the standard is (pragmatic) and addressed toward commercial applications such as Redundant Array of Independent Disks, or RAID.

Since the public introduction of SCSI in 1981, there have been seven generations of the parallel SCSI protocol. Each generation essentially doubled the bandwidth of the previous one, primarily by doubling the bus clock frequency. But as the bus frequency was increased with each new generation, so did the negative impact of bus contention, signal degradation, and signal skew, i.e., slight signal delays from one wire trace to the next. After the development of Ultra320 SCSI standard with a bandwidth of 320 MB/s per channel, further bandwidth improvements to parallel SCSI may be difficult without developing new and expensive technologies.

Serial Attached SCSI, commonly referred to as SAS, is a relatively recently-developed computer bus used to move data to and from computer storage devices. SAS was later transferred to the InterNational Committee for Information Technology Standards (INCITS) T10 to become an American National Standards Institute, or ANSI, and International Organization for Standardization/International Electrotechnical Commission, or ISO/IEC, standard. SAS uses a point-to-point serial protocol that replaces the parallel SCSI bus technology in data centers and workstations. SAS applies the command set from parallel SCSI, frame formats and full duplex communication of Fibre Channel. Also, SAS uses the Serial Advanced Technology Attachment, often abbreviated Serial ATA or simply SATA, interface for compatibility and investment protection. The SAS architecture addresses the parallel SCSI problems of bus contention, clock skew, and signal degradation at higher signaling rates, and can provide performance headroom in enterprise storage applications over SCSI.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
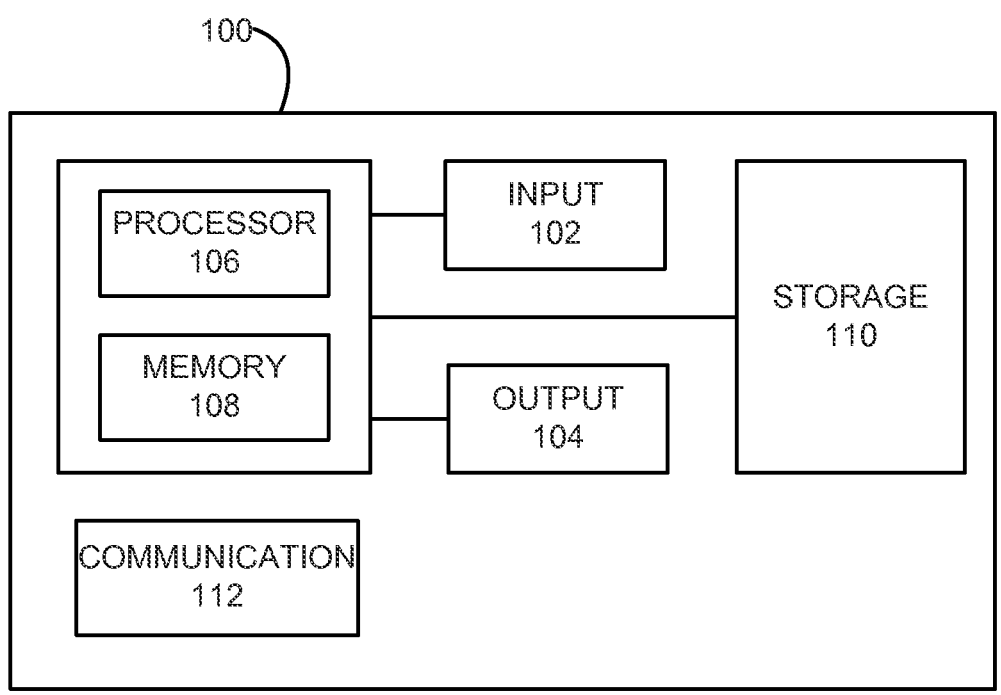
FIG. 1 is a block diagram illustrating an example of a computing device.

FIG. 1 illustrates an embodiment of a computer system and includes a computing device 100 that can be employed in an SAS domain and used to propagate power management for devices in the SAS domain. The computing device 100 can include a server, mobile device, gaming system, computer peripheral, interchangeable disk drive, or other device, and is not intended to be limited to a particular class of devices known as computers. In one example, the computing device 100 can include or can be coupled to one or more input devices 102, such as keyboard, pointing device (e.g., mouse), voice input device, touch input device, or other input connection. Computing device 100 can also include or can be coupled one or more output devices 104, such as a display, printer, or other output connection. In a basic configuration, computing device 100 typically includes a processor architecture having at least one processing unit, i.e., processor 106, and memory 108. Depending on the configuration and type of computing device, memory 106 may be volatile, non-volatile, or some combination of the two. The memory 108 can be arranged in a memory hierarchy such as a cache. Computing device 100 can also include additional storage 110 including, but not limited to, magnetic or optical disks or solid state memory, or flash storage devices for storage of information such as computer readable instructions, data structures, program modules or other data. The computing device 100 can be configured to run computer readable instructions such as firmware from a non-transitory tangible storage media and an operating system software program that can be stored on the storage media or memory as well as one or more software applications including firmware, which make up a system platform.

Memory 108 and storage 110 are examples of computer storage media that can be used to store the desired information and that can be accessed by computing device 100 or by other devices. Computer storage media can be part of computing device 100. Computing device 100 can also include one or more communication connections 112 that allow the computing device 100 to communicate with other devices on a network such as the Internet or a data storage fabric.

Figure 2:
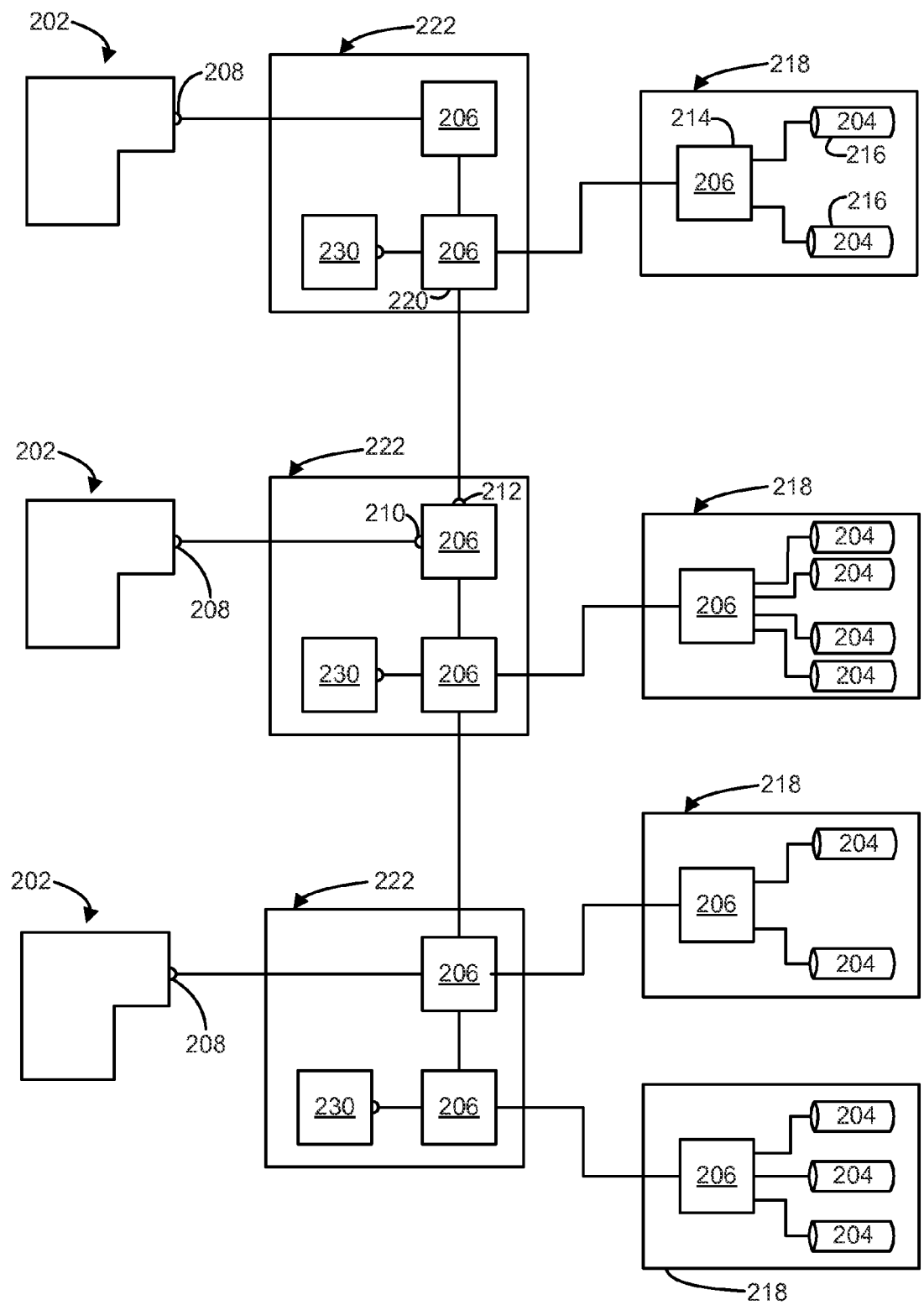
FIG. 2 is a schematic diagram illustrating an example of an SAS fabric that can be configured to employ computing devices such as the computing device of FIG. 1.

FIG. 2 illustrates an example SAS fabric, or SAS domain 200. SAS is a point-to-point architecture that transfers data to and from SCSI storage devices by using serial communication. In general, an SAS domain is an input/output (I/O) system having a set of SAS devices that communicate with one another by means of a service delivery subsystem. SAS devices the SAS domain 200 use to achieve reliable, high-speed serial communication in general include initiators 202, targets 204, and expanders 206, which can be considered a type of computing device 100. Each SAS device has a unique worldwide name, or SAS address, which identifies of an initiator port, a target port, or an expander device, assigned at manufacturing to simplify its identification in a domain.

The initiator 202 is a host bus adaptor (HBA), or controller that at times may be a stand-alone device or can be included as a component in the computing device 100. The initiator 202 is attached to one or more targets 204, such as SAS hard disk drives, SATA hard disk drives, and SAS tape drives, to form an SAS domain. An initiator 202 often includes one or more of Serial SCSI Protocol (SSP) ports typically used to communicate with SAS drives, Serial ATA Tunneling Protocol (STP) ports typically used to communicate with SATA drives, and/or Serial Management Protocol (SMP) ports typically used to communicate with expanders 206 in an SAS domain.

An SAS initiator 202 typically includes multiple ports 208 for connection to internal targets, external targets, such as targets 204, or both. An internal target can include, for example, a RAID system including SAS or SATA drives included within the computing device 100, which can include a server. Each initiator port can have a single physical link, which can be referred to as a narrow port, or 2, 4, 8 or more physical links, which can be referred to as a wide port and are described below. SAS initiator ports can be connected to separate domains for fail-over redundancy. SAS hard drives (such as enterprise-class and midline devices) can have two narrow ports. Each port can reside in a different SAS domain to provide fail-over redundancy and load balancing. SAS hard drives leverage a common electrical and Physical connection interface with SATA hard drives. However, SATA hard drives, including solid-state drives, can have a single narrow port.

A PHY is an object in a device that is used to interface to other devices. A physical PHY is a PHY that includes a transceiver and electrically interfaces to a physical link to communicate with another physical PHY. A virtual PHY is a PHY that interfaces with a vendor-specific interface to another virtual PHY inside the same device. A PHY is a mechanism that contains a transceiver that electrically interfaces to a physical link. In one example, a physical link includes two differential signal pairs, one pair in each direction, to connect together two physical PHYs. A wide port includes more than one PHY, and a wide link is a group of physical links that attaches a wide port to another wide port. In the example fabric 200, PHYs are included in the disk drive bays, rather than the drives themselves, as the drives can be easily interchanged.

Expanders 206 are high-speed switches that scale the number of targets 204 attached to an initiator 202, thereby creating a larger SAS domain 200. Expanders 206 establish connections between initiators 202, targets 204, and other expanders 206 by receiving commands and data in one port, such as a port 210 proximal to the initiator 202, and routing them to another port, such as port 212 distal to the initiator 202, based on the SAS address of the target 204. In some examples, an expander 214 includes a port distal to the initiator 202 directly coupled to a target 216, such as within a storage enclosure 218 and can be referred to here as an enclosure expander 214. The storage enclosure 218 can include multiple targets 216 and a storage enclosure processing system 220 in addition to the enclosure expander 214. In other examples, an expander 222 includes a port distal to the initiator 202 directly coupled to another expander 206 and can be referred to here as a switch expander 222. In the illustrated example, the initiator 202 is coupled to switch expander 222 that is coupled to an enclosure expander 214 that is coupled to the targets 216.

Expanders 206 use three routing methods—direct, table, and subtractive. An expander, such as enclosure expander 214, uses direct routing to forward commands and data to targets 216 directly attached to the enclosure expander 214. An expander, such as switch expander 222, uses table routing to forward commands and data to another expander, such as enclosure expander 214 or to another switch expander (not shown). Table routing is used for identifying devices connected to the expanders connected to a device's own PHY. When an expander 206 receives an address that it does not recognize, it uses subtractive routing to forward the commands and data to another expander 206 that does recognize the address.

Many storage networks can be implemented with just a set of typical SAS switch expander 222 (such as 16 ports as currently used), but there are some larger customers that would prefer to have double or triple the amounts of ports as typical switch expander 222. To meet the demands of large storage networks, two or more typical switch expanders 222 can be trunked together, or formed as a daisy chain, to enlarge the SAS fabric 200. In one example, a switch expander 222 proximate to an initiator 202 can have a port distal to the initiator 202 coupled to another switch expander at a port proximal to the initiator 202. Trunking can continue in this manner until the SAS fabric 200 is configured to meet the demands of the user. SAS fabrics 200 can be initially configure with trunked switch expanders 222, switch expanders 222 can be later trunked to incrementally scale the network, or a combination of the two.

The number of SAS devices in a given domain 200 is limited only by the size of the expander routing tables, but managing a large number of devices can be complicated. Zoning is a management tool included in the SAS standard, such as SAS-2 and above, to provide for traffic management and security. Second-generation SAS (SAS-2) link speed doubles the physical link rate to 6.0 Gb/s. SAS-2 eliminates the distinction between fanout and edge expanders with self-configuring expanders. SAS-2 is backward compatible with SAS-1. SAS-2 also enables zoning for enhanced resource deployment flexibility, security, and data traffic management.

Through the use of zoning, large physical topologies can be broken into logical groups such as zone groups, which are a set of PHYs in a zone that all have the same access permission. A group of zoning-enabled expanders that cooperate to control access between PHYs is known as a zoned portion of a service delivery system (ZPSDS). Examples of zoning include 128 or 256 zone groups numbered from 0 to 127 or 0 to 255, respectively. Zone groups 0 through 8 are pre-defined in the SAS standard. Devices in zone group 0 can only access devices in zone group 1, while devices in zone group 1 are allowed access to all zone groups. For example, a system administrator can use zone group 0 for a new (unassigned) device that is added to a ZPSDS. The administrator can also use zone group 1 for topology discovery and zone management. In one example, one ZPSDS is created per fabric 200.

Permission tables in SAS expanders 206 control zoning. An end device does not require any special features to operate within a zoned SAS domain, which makes legacy SAS and SATA devices compatible. An end device in a zone can interface with other end devices in the domain as permitted by the zoning expander. The SAS-2 standard permits zoning, a secure zoning method that uses the unique identifier (ID) number of each expander PHY. In zoning, each port of a zoning expander is assigned to a zone group, and any device attached to one of the ports becomes part of that respective zone group. Devices within a zone group can interact with each other. The permission table in the expander controls access between devices in different zone groups. If an attached device changes, the expander may be configured to set the zone group to 0, or no access, which allows an address-resolved-like policy to be implemented. For example, if a particular SAS device address includes certain permissions and the device is moved to a different expander in the fabric, then the zone manager can reprogram the zone group at the new location.

A zone manager 230 is responsible for configuring each zone. The zone manager 230 can control a zone by using an end device that has an SAS port connected to one of the zoning expanders. The zone manager 230 can also control a zone through a sideband interface (such as Ethernet) on one or more zoning expanders. The zone manager 230 assigns zone groups to all zoning expander PHYs, and it assigns all PHYs in a wide port to the same zone group. The zone manager 230 stores the zoning assignment of each expander PHY along with SAS addresses in the zoning expander's route table. Inside a particular ZPSDS, the zone manager assigns each zoning expander PHY attached to another zoning expander PHY to zone group 1. PHYs in zone group 1 have access to PHYs in all zone groups. The zone manager 230 assigns each zoning expander PHY on the boundary of the ZPSDS to a zone group other than group 1. The ZPSDS boundary is defined by designating expander PHYs as "not trusted" when connected to end devices outside the zone. Each zoning expander device also contains a zone permission table that controls whether a connection is allowed between PHYs in different zone groups.

Another feature in the SAS-2 standard permits for transceivers within SAS PHYs to enter various power conditions. Example power conditions include full power states where a device actively being used in the fabric. At times, however, devices in the fabric go unused, and full power states result in an inefficient use of power in the data center, which can lead to additional expenses and wear on the devices. Accordingly, The SAS standard permits for PHYs to enter one of a plurality of power conditions less than the full power condition when no communication is expected with the target device until the PHY resumes the full power state.

SAS power conditions include an Active PHY power condition and two low power PHY conditions including a Partial PHY power condition and a Slumber PHY power condition. A PHY is capable of transmitting information and responding to received information while in the Active PHY power condition without changing the power condition. The PHY may consume more power in the Active PHY power condition than when the PHY is in a low PHY power condition. One low power condition is a Partial PHY power condition. While in the Partial PHY power condition, a PHY is just capable of processing a COMINIT or COMWAKE command. The PHY in the Partial PHY power condition may take less time to return to the Active PHY power condition than when in the Slumber PHY power condition. Also, the power consumed by the PHY is typically less than or equal to the power consumed when the PHY is in the Active PHY power condition and may be greater than the power consumed when the PHY is in the Slumber PHY power condition. While in the Slumber PHY power condition, the PHY is also just capable of processing a COMINIT or COMWAKE command. The PHY in the slumber power condition may take more time to return to the Active PHY power condition than when in the Partial PHY power condition. Also, the power consumed by the PHY in the Slumber PHY power condition is typically less than the power consumed when the PHY is in the Active PHY power condition or when the PHY is in the Partial PHY power condition. The SAS 2.1 specification provides for power control of various devices in the fabric in the power conditions.

While the power conditions allow the PHYs to select the appropriate states to use and conserve power and resources, some devices can continue to operate at full power even when the PHY is in a low power condition, which is also an inefficient use of power and also creates wear on mechanical components of the target devices. For example, even if the PHY of the drive bay or in the associated expander is put into a low power condition, the drive within the drive bay can continue to operate in full power mode. Such devices, having power conditions not affected by a change of power condition in the correspondingly connected PHY according to specification, is referred to as an power condition independent device for the purposes of this disclosure, and can include drives connected to the bays 204, the bays, or other devices in the fabric 200. Power condition independent devices also can be considered a type of computing device 100. Despite operating a PHY in a low power condition, a corresponding power condition independent device operating at full power still can operate at full power, which can inefficiently use resources and cause wear, even if the low power condition persists for an extended period of time.

Fabric 200 is configured to implement a policy of propagating power states to devices beyond the specification so power condition independent devices can follow the power states of the corresponding expanders 206 and automatically enters a comparable power mode because no communication is expected to it through the expander. In the example fabric 200, the firmware of the drives within the targets 204, i.e., the drive bays, is configured to detect the power condition of the corresponding PHY, such as expander 206 or drive bay 204, and set a comparable low power state.

Figure 3:
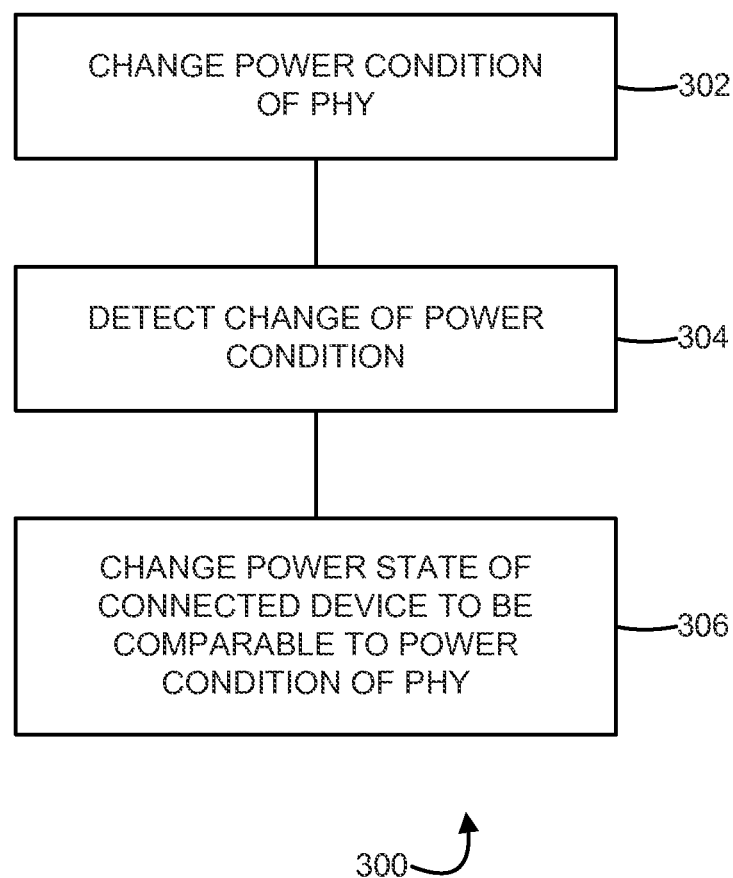
FIG. 3 is a block diagram illustrating an example of a method for propagating power conditions in the SAS fabric of FIG. 2.

FIG. 3 illustrates a process 300 for propagating power states within the fabric 200. One or more PHYs are changed from a first power condition selected from a set of power conditions to a second power condition selected from the set of power conditions at 302. In one example, the set of power conditions include the active power condition and the low power conditions. Typically, the initiators 202, or at times the zoning manager 230, can set the power conditions to the PHYs. A power condition independent device coupled to the PHY detects the change from the first power condition to the second power condition at 304. The power condition independent device, which is also in a particular power state, changes the power state to a comparable power state of the second power condition at 306.

A comparable power state can include the lowest power state of the power condition independent device can quickly resume without an appreciable degradation in performance. For example, a disk may include three power states that, in descending order of power consumption include an active mode, a standby mode, and a spindown mode. Typically, a disk can transition from standby mode to active mode quicker than from spindown mode to active mode. In this example, the active mode of the power condition independent disk would compare with the ready state of the PHY or Active PHY power condition. The standby mode of the disk would compare with the Partial PHY power condition, and the spindown mode of the disk would compare with the Slumber PHY power condition of the corresponding PHY.

Thus, in one example, if the initiator changed the power condition of a selected PHY from Active PHY power condition to Partial PHY power condition at 302, the power condition independent device would detect the change through its firmware at 304, and the power condition independent device would change its power state from active mode to standby mode at 306. In another example, if the initiator changed the power condition of the PHY from Slumber PHY power condition to Active PHY power condition at 306, the firmware of the power condition independent device would detect the change at 304, and would change the power state of the power condition independent device from a spindown mode to active mode. Thus, the comparable power state includes the lowest power state of the power condition independent device that can quickly resume without an appreciable degradation in performance.

It is contemplated that the number of different power conditions of the PHY may not be equal to the number of power states of the power condition independent device. For example, the PHY may include power conditions Active, Partial, and Slumber while the power condition independent device may include four different power states. In this case, the comparable power state of the device can track the most appropriate corresponding resume time as the power condition of the PHY.

Firmware in the expander 206 could use zoning information to propagate the PHY power condition to any power independent devices zoned to the initiator or initiators requesting the power condition change. In certain cases, the power condition independent device may be zoned to more than one initiator. In such as case, the power condition independent device can be configured to accept the highest power condition of the initiators. For example, if a power condition independent device is zoned to two initiators, both currently in the Active PHY power condition, and a first of the two initiators changes to the Partial PHY power condition and the second initiator remains in the Active PHY power condition, the power condition independent device will remain in active mode. If the second initiator were to then change to the Slumber PHY power condition, the power condition independent device would change to the standby mode, rather than spindown mode, because the first of the two initiators is in the higher power state.

Although specific embodiments have been illustrated and described herein, it will be appreciated that a variety of alternate and/or equivalent implementations may be substituted for the specific embodiments shown and described without departing from the scope of the present application. This application is intended to cover any adaptations or variations of the specific embodiments discussed herein.

What is claimed is:

1. A method of power management for devices in a data storage fabric, the method comprising:
    changing a power configuration of a PHY in the data storage fabric from a first power condition to a second power condition, wherein the first and second power conditions correspond with a specification of the data storage fabric;
    detecting the changing power condition of the PHY with a power condition independent device in the data storage fabric coupled to the PHY, wherein the power condition independent device includes a plurality of power states unaffected by the specification; and
    changing a power state of the plurality of power states in the power condition independent device to a comparable power state preselected to correspond with the second power condition.

2. The method of claim 1 wherein each of the power states in the plurality of power states corresponds with a comparable power condition.

3. The method of claim 1 wherein an active power condition corresponds with an active power state, a partial power condition corresponds with a standby power state, and a slumber power condition corresponds with a spindown power state.

4. The method of claim 1 wherein the power conditions include active, partial, and slumber in a Serial Attached Small Computer System Interface storage data fabric.

5. The method of claim 4 wherein the partial power condition and the slumber power condition are just able to respond to COMINIT and COMWAKE commands.

6. The method of claim 4 wherein the PHY is associated with an expander and the power condition independent device is a disk drive.

7. The method of claim 4 wherein the partial power condition uses less time to recover to the active power condition than the slumber power condition.

8. The method of claim 7 wherein a comparable power state preselected to correspond with the partial power condition takes less time to recover to a comparable power state preselected to correspond to the active power condition than a comparable power state preselected to correspond with the slumber power condition.

9. The method of claim 4 wherein a PHY is included in multiple zones each having independent power conditions.

10. The method of claim 9 wherein power condition independent device is set to a comparable power state corresponding to a zone of the multiple zones having the highest power condition.

11. The method of claim 4 wherein an initiator coupled to the PHY affects the changing of the first power condition to the second power condition.

12. The method of claim 11 wherein the first power condition is the active power condition.

13. The method of claim 1 wherein detecting the changing power condition of the PHY includes detecting the changing power condition of the PHY with firmware of the power condition independent device.

14. A method of power management for devices in a Serial Attached Small Computer System Interface (SAS) data storage fabric, the method comprising:
    operating a PHY in the SAS data storage fabric having a plurality of power conditions according to an SAS specification;
    operating a power condition independent device coupled to the PHY in the SAS data storage fabric wherein the power condition independent device includes a plurality of power states unaffected by the specification;
    changing a power configuration of the PHY in the data storage fabric from a first power condition of the plurality of power conditions to a second power condition of the plurality of power conditions;
    detecting the changing power condition of the PHY with the power condition independent device; and
    changing a power state of the power condition independent device to a comparable power state of the plurality of power states preselected to correspond with the second power condition of the plurality of power conditions.

15. The method of claim 14 wherein the PHY includes an active power condition, a partial power condition, and a slumber power condition.

16. The method of claim 15 wherein an active power state of the plurality of power states corresponds with the active power condition, a standby power state of the plurality of power states corresponds with the partial power condition, and a spindown power state of the plurality of power states corresponds with the slumber power condition.

17. The method of claim 16 wherein the standby power state recovers more quickly to the active power state than the spindown power state.

18. A non-transitory computer readable storage medium storing computer executable instructions for controlling a computing device to perform a method of power management for devices in a Serial Attached Small Computer System Interface (SAS) data storage fabric, the instructions are executable by a processor to:
    detect a change in power condition of a PHY from a first power condition to a second power condition, wherein the first and second power conditions correspond with an SAS specification of the data storage fabric; and
    change a power state of the plurality of power states in the power condition independent device to a comparable power state preselected to correspond with the second power condition, wherein the power states of the power condition independent device are unaffected by the SAS specification.

19. The non-transitory computer readable storage medium of claim 18 wherein an active power condition corresponds with an active power state, a partial power condition corresponds with a standby power state, and a slumber power condition corresponds with a spindown power state.

20. The non-transitory computer readable storage medium of claim 1 wherein the computer readable storage medium is firmware included in the power condition independent device.

* * * * *